United States Patent
Miron (10) Patent No.: US 8,297,234 B2
(45) Date of Patent: Oct. 30, 2012

(54) MODULAR LEASH SYSTEM

(76) Inventor: Nicholas Peter Okun Miron, Greenwich, CT (US)

( * ) Notice: Subject to any disclaimer, the term of this patent is extended or adjusted under 35 U.S.C. 154(b) by 233 days.

(21) Appl. No.: 12/421,079

(22) Filed: Apr. 9, 2009

(65) Prior Publication Data

US 2010/0258061 A1   Oct. 14, 2010

(51) Int. Cl.
*A01K 27/00* (2006.01)

(52) U.S. Cl. .......................... 119/795; 119/792

(58) Field of Classification Search .......... 119/795, 119/798, 792, 793, 770; 24/135 N; 403/294; *A01K 27/00*

See application file for complete search history.

(56) References Cited

U.S. PATENT DOCUMENTS

| | | | | |
|---|---|---|---|---|
| 2,737,154 A * | 3/1956 | Michonski | ...... | 119/798 |
| 4,045,911 A * | 9/1977 | Ware | ...... | 47/39 |
| 4,244,145 A * | 1/1981 | Polacsek | ...... | 47/17 |
| 4,312,260 A * | 1/1982 | Morieras | ...... | 87/1 |
| 4,445,866 A * | 5/1984 | Cillieres | ...... | 434/253 |
| 4,514,929 A * | 5/1985 | Lestraden | ...... | 47/17 |
| 5,361,726 A * | 11/1994 | Harris et al. | ...... | 119/797 |
| 6,000,979 A * | 12/1999 | Stewart | ...... | 441/75 |
| 6,053,129 A * | 4/2000 | Akre | ...... | 119/795 |
| 6,231,205 B1 * | 5/2001 | Slesinger et al. | ...... | 362/133 |
| 6,250,256 B1 * | 6/2001 | Lin | ...... | 119/795 |
| 6,474,838 B2 * | 11/2002 | Fang et al. | ...... | 362/231 |
| 7,389,750 B1 * | 6/2008 | Rogers et al. | ...... | 119/792 |
| 7,467,604 B1 * | 12/2008 | Werner et al. | ...... | 119/770 |
| 7,559,715 B2 * | 7/2009 | Germain et al. | ...... | 403/294 |
| 7,637,230 B1 * | 12/2009 | Eicks | ...... | 119/805 |
| 8,074,437 B2 * | 12/2011 | Measom et al. | ...... | 57/241 |
| 2001/0047618 A1 * | 12/2001 | Fang et al. | ...... | 47/65.5 |
| 2003/0041812 A1 * | 3/2003 | Lai | ...... | 119/795 |
| 2004/0082263 A1 * | 4/2004 | Parrish | ...... | 446/245 |
| 2004/0264160 A1 * | 12/2004 | Bienick | ...... | 362/31 |
| 2006/0032460 A1 * | 2/2006 | Hurwitz | ...... | 119/795 |
| 2006/0032830 A1 * | 2/2006 | Engel | ...... | 211/187 |
| 2007/0119386 A1 * | 5/2007 | Kung | ...... | 119/798 |
| 2008/0043456 A1 * | 2/2008 | Bernardini et al. | ...... | 362/94 |
| 2008/0216769 A1 * | 9/2008 | LaCross | ...... | 119/798 |
| 2010/0251971 A1 * | 10/2010 | Hsieh | ...... | 119/798 |
| 2012/0042837 A1 * | 2/2012 | Vandenbulcke | ...... | 119/792 |

* cited by examiner

*Primary Examiner* — Rob Swiatek
*Assistant Examiner* — Kathleen Iwasaki
(74) *Attorney, Agent, or Firm* — Holland & Knight LLP; Brian J. Colandreo, Esq.; Michael T. Abramson, Esq.

(57) ABSTRACT

A modular leash system including a flexible lead having a first and second rigid end portion. A first end cap is removably attachable to the first rigid end portion via set screw configured to be received through cooperating holes in the first end cap and the first rigid end portion. The first end cap includes a loop for coupling the first end cap to a collar connector. A second end cap is removably attachable to the second rigid end portion via a set screw configured to be received through cooperating holes in the second end cap and the second rigid end portion. The second end cap configured to be coupled to a handle portion.

13 Claims, 8 Drawing Sheets

MODULAR LEASH SYSTEM

TECHNICAL FIELD

The present disclosure generally relates to pet leashes, and more particularly relates to modular pet leashes.

BACKGROUND

Domesticated animals, such as dogs, require regular exercise, which is often accomplished by walking with the animal's owner. While walking with their pet, it is necessary for the owner of the pet to be able to control their pet. The ability of the owner to control their pet is important, not only to prevent the pet from running away or endangering others, but also to protect the animal. This is especially the case in urban environments we common vehicle traffic. Leashes are commonly used to provide an owner with the ability to control or restrain their pet, while still providing a sufficient amount of freedom of movement by the animal.

SUMMARY OF THE DISCLOSURE

According to a first implementation, a modular leash includes a flexible lead. An end cap is removably attachable to at least a first end of the flexible lead. An accessory removably attachable to the flexible lead via the end cap.

One or more of the following features may be included. The flexible lead may include rope. The first end of the rope may include a rigid portion. The first end of the rope may be impregnated with a polymer resin to form the rigid portion.

The end cap may include an opening configured to receive at least a portion of the rigid portion of the flexible lead. The end cap may be removably attachable to the first end of the flexible lead by a screw engageable with the first end of the flexible lead. The screw may be configured to be received in a hole in the first end of the flexible lead.

The accessory may be removably attachable to the end cap. The accessory may be removably attachable to the end cap by a screw engageable with at least a portion of the accessory. The accessory may include a leash handle. The accessory may include a collar connector for releasably coupling the flexible lead to an animal collar. The collar connector may include a carabiner. The end cap may include a cable loop configured to be releasably coupled to the carabiner.

According to another implementation a modular leash includes a flexible lead having a first and second rigid end portion. A first end cap is removably attachable to the first rigid end portion via set screw. The set screw is configured to be received through cooperating holes in the first end cap and the first rigid end portion The first end cap includes a loop for coupling the first end cap to a collar connector. A second end cap is removably attachable to the second rigid end portion via a set screw. The set screw is configured to be received through cooperating holes in the second end cap and the second rigid end portion. The second end cap is configured to be coupled to a handle portion.

One or more of the following features may be included. The flexible lead may include rope, and the first and second rigid ends may be impregnated with a generally rigid polymeric material. The loop for coupling the first end cap to the collar connector may include a cable loop. The second end cap may be configured to be removably coupled to the handle portion.

According to another implementation, an animal collar includes a flexible member, and a fastening ring coupled to a first portion of the flexible member. A counterweight is coupled to a second portion of the flexible member. The counterweight configured to bias the fastening ring toward and upward position is use.

One or more of the following features may be included. The fastening ring may include an o-shaped ring. The counterweight may include a buckle assembly. The flexible member may include woven fabric webbing.

The details of one or more implementations are set forth in the accompanying drawings and the description below. Other features and advantages will become apparent from the description, the drawings, and the claims

DETAILED DESCRIPTION

Figure 1:
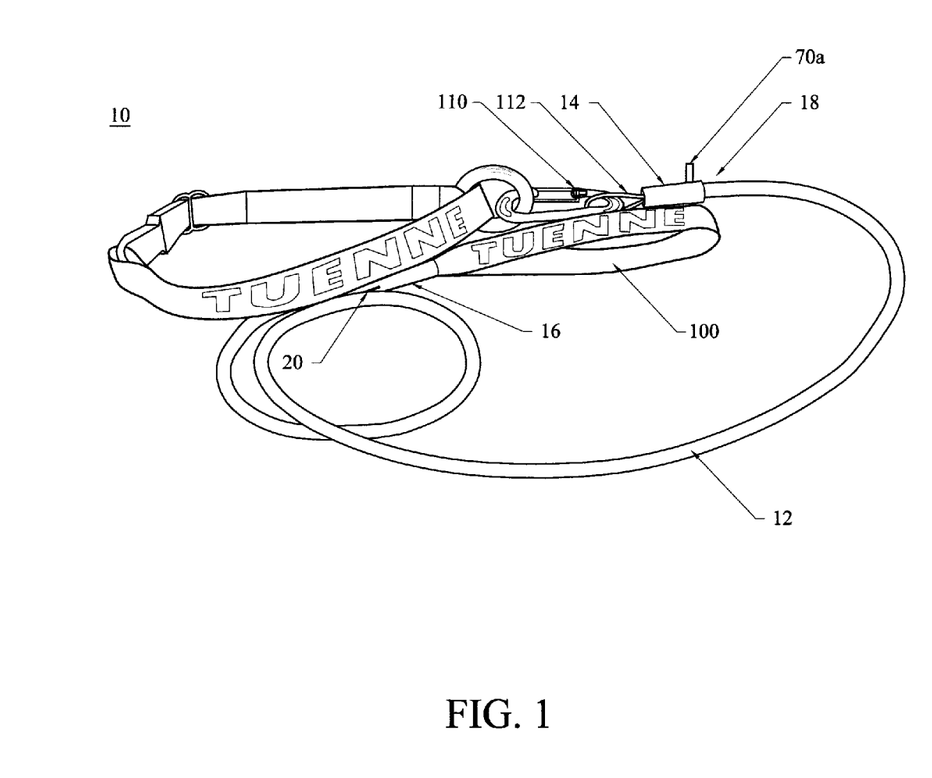
FIG. 1 depicts an embodiment of a modular leash system.

Referring to FIG. 1, modular leash system 10 is generally shown. Modular leash system 10 may generally include flexible lead 12. An end cap (e.g., end caps 14, 16) may be removably attachable to at least a first end of flexible lead 12 (e.g., generally at ends 18, 20). An accessory may be removably attachable to flexible lead 12 via the end cap (e.g., via one or more of end caps 14, 16). As will be discussed in detail below, various accessories may be removably attachable to flexible lead 12 via an end cap. Examples of such accessories may include, but are not limited to, leash handles, collar connectors (e.g., allowing flexible lead 12 to be coupled to an animal collar), and the like.

While flexible lead 12 may include any flexible material, according to an example, flexible lead 12 may include rope, webbing, or the like. As will be appreciated flexible lead 12 may include rope made from various materials (e.g., nylon, polypropylene, hemp, and the like) and having various configurations (e.g., a braided sheath over a braided or non-braided core, solid braided, twisted, or the like). According to one embodiment, flexible lead 12 may include rock climbing rope, e.g., which may generally include a braided outer sheath surrounding either a braided or a filament core, such as rock climbing rope available from Black Diamond Equipment Ltd., and Petzl.

One or more of ends 18, 20 of flexible lead 12 (e.g., which may include rope, as discussed above) may include a rigid portion. According to an embodiment, an end of flexible lead 12 (e.g., end 18) may be impregnated with a polymer resin to form the rigid portion. For example, and with reference also to FIG. 2, end 18 of flexible lead 12 may be place in mold 22 and may be impregnated with the polymer resin. Mold 22 may, for example, include upper mold component 24 and lower mold component 26. Each of upper mold component 24 and lower mold component 26 may include a channel (e.g., channels 28, 30, 32, 34 of upper mold component 24), which may cooperate to define a desired geometry of rigid portion of flexible lead ends (e.g., end 18). For example, the channels may each be semi-cylindrical to define a cylindrical geometry of rigid portion of end 18, although other geometries may equally be utilized.

Figure 2:
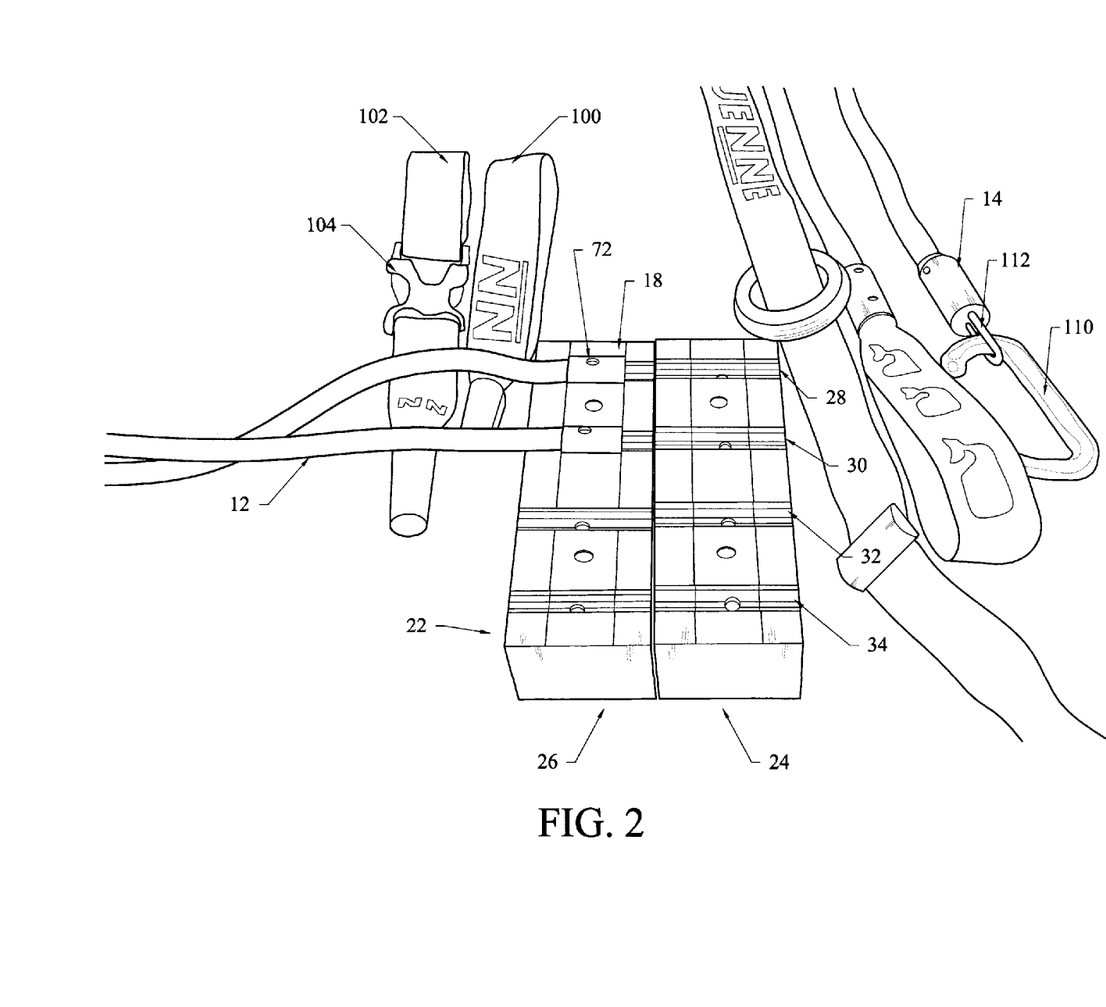
FIG. 2 depicts a modular leash system including various accessories and a mold that may be used in the production of the leash system.
Figure 3A:
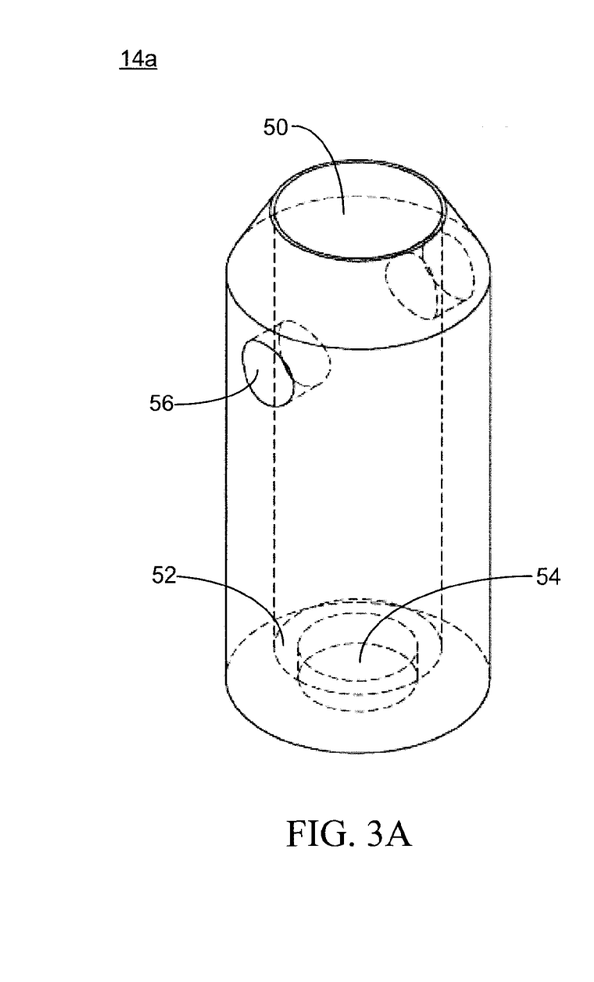
FIGS. 3A-3B diagrammatically depict an embodiment of an end cap.
Figure 3B:
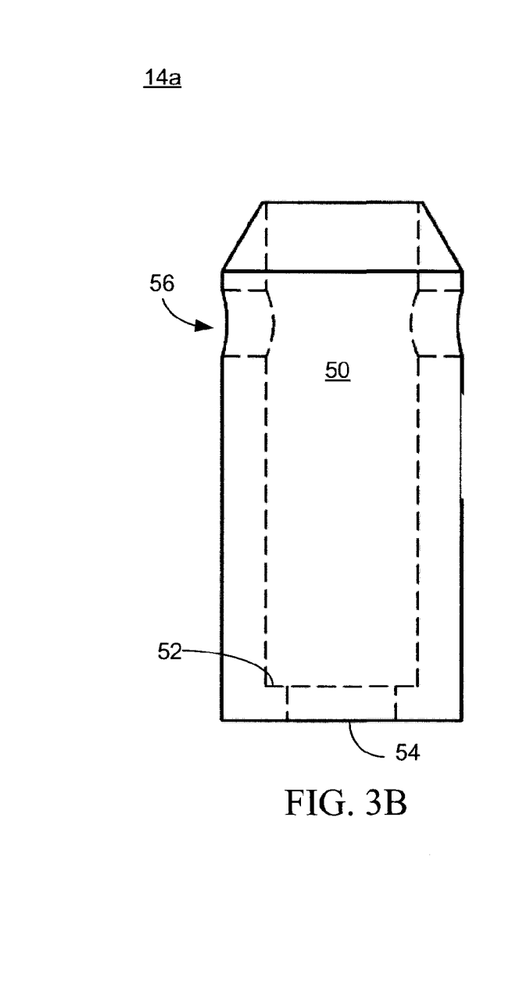

End 18 may be placed in mold 22, e.g., by disposing end 18 in a channel formed in lower mold component 26, and coupling upper mod component 24 to lower mold component 26 (e.g., by bolting or clamping upper mold component 24 and lower mold component 26 together). Flexible lead end 18 may be impregnated with the polymer resin (e.g., which may include, but is not limited to, a two part epoxy resin, a urethane resin, acrylic resin, or other suitable polymer resin) by injecting the polymer resin into the channel in mold 22, by applying the resin to end 18, e.g., via an opening in mold 22 (e.g., which may allow the resin to impregnate end 18 via capillary action), or the like. Additionally/alternatively, the polymer resin may be applied to end 18 prior to disposing end 18 in mold 22. For example, end 18 of flexible lead 12 may be dipped in a liquid polymer resin, and may then be clamped in mold 22. For example, end 18, having been dipped in the polymer resin may be placed in a channel of a mold component (e.g., channel 28 of upper mold component 24, and clamping lower mold component 26 to upper mold component 24.

The end cap may include an opening configured to receive at least a portion of the rigid portion of the flexible lead. For example, and referring also to FIGS. 3A-3B and FIGS. 4A-4B, various embodiments of end caps 14, 16 are shown. End cap 14a may include a generally cylindrical geometry having opening 50 defined therein. One end of opening 50 may include, for example, shoulder 52 defined, at least in part, by opening 54, e.g., which may have a smaller diameter than opening 50. End cap 14a may further include through-hole 56, e.g., which may generally transverse to the longitudinal dimension of opening 50.

Figure 4A:
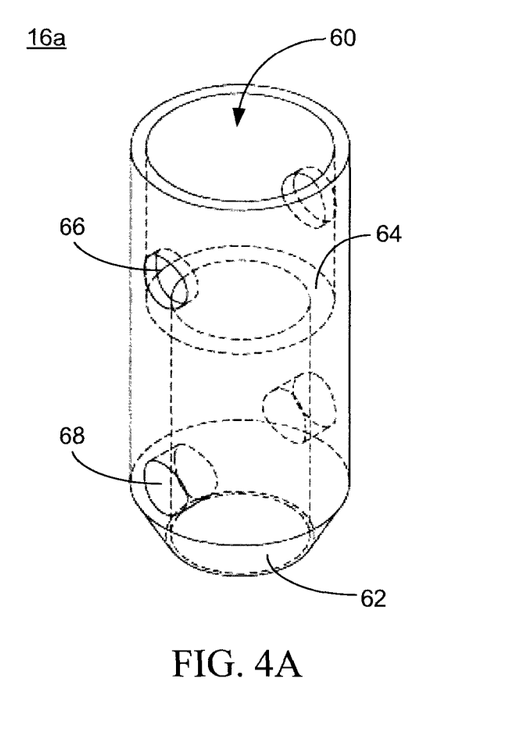
FIGS. 4A-4B diagrammatically depict another embodiment of an end cap.
Figure 4B:
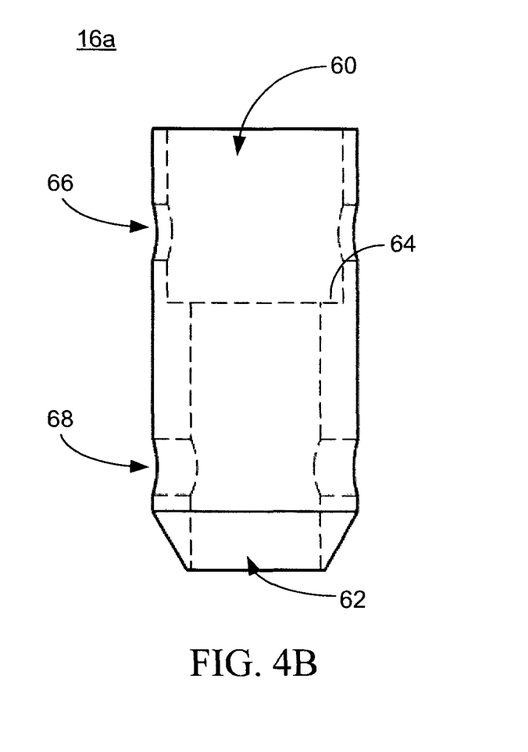

In another embodiment, shown in FIGS. 4A-4B, end cap 16a may include a first opening 60 having a first diameter and a second opening 62 having a second diameter less than the first diameter, defining shoulder 64. End cap 16a may include a first through-hole 66 extending through first opening 60, and may be generally transverse to the longitudinal dimension of first opening 60. End cap 16a may additionally include a second through-hole 68 extending through second opening 62, and may be generally transverse to the longitudinal dimension of second opening 62.

Figure 5:
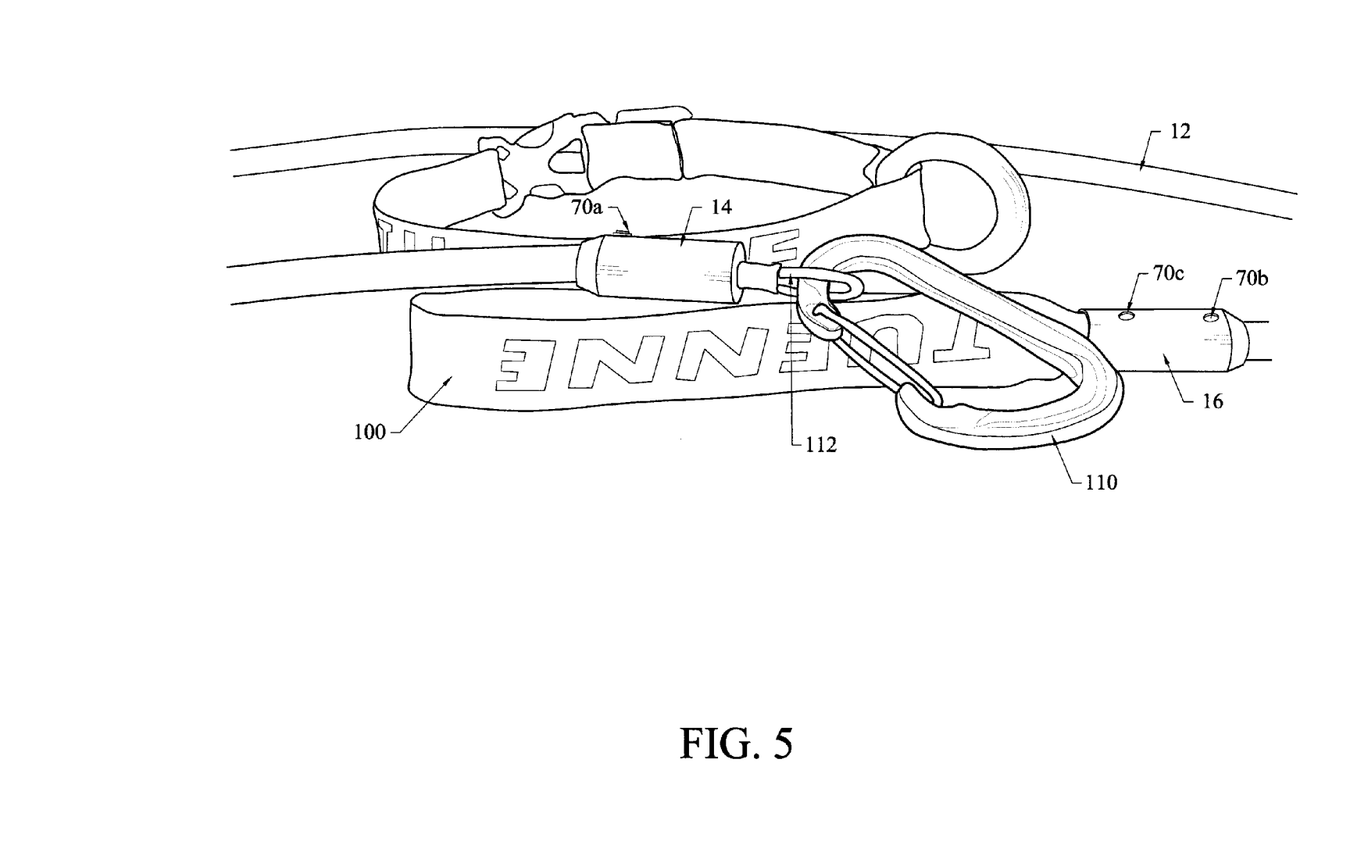
FIG. 5 depicts an embodiment of a modular leash system.
Figure 6:
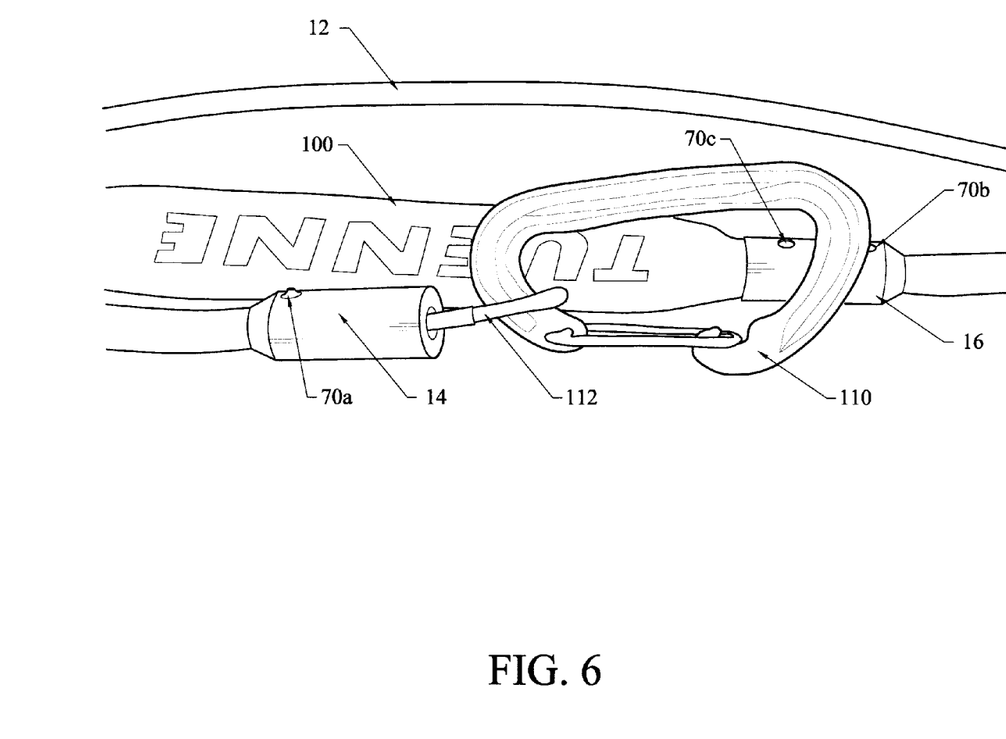
FIG. 6 depicts an embodiment of a modular leash system including a handle and a collar connector.

Rigid end portion 18 of flexible lead 12 may be at least partially received in the opening of end cap 14 (e.g., at least partially received in opening 50). End cap 14 may be removably attachable to rigid end portion 18 of flexible lead 12 using a pin (e.g., a roll pin, screw, such as set screw 70a shown in FIGS. 5 and 7, or the like) configured to be received in hole (e.g., hole 56) in end cap 14 and a cooperating hole in rigid end 18 of flexible lead 12 (e.g., cooperating hole 72 shown in FIGS. 2 and 7). Impregnation of end 18 with a polymer resin may, at least in part, resist unintended separation of flexible lead 12 from end cap 14, e.g., by resisting unraveling of flexible lead 12.

In a similar manner, rigid end portion 20 may be at least partially received in the opening of end cap 16 (e.g., at least partially received in opening 62). End cap 16 may be removably attachable to rigid end portion 20 of flexible lead 12 using a pin (e.g., a roll pin, screw, such as set screw 70b shown in FIGS. 5 and 7, or the like) configured to be received in a hole (e.g., hole 68) in end cap 16 and a cooperating hole in rigid end portion 20 of flexible lead 12 (e.g., cooperating hole 74 shown in FIG. 7). Impregnation of end 20 with a polymer resin may, at least in part, resist unintended separation of flexible lead 12 from end cap 16, e.g., by resisting unraveling of flexible lead 12.

End caps 14, 16 may include any suitable material, e.g., aluminum, stainless steel, magnesium, brass, plastic (e.g., nylon, acrylic, urethane, etc.), or the like. While end caps 14, 16 are shown having a generally cylindrical geometry, this is not intended as a limitation of the present disclosure, as other geometries (e.g., rectangular, oval, prismatic, etc.) may be equally utilized.

As mentioned above, various accessories may be removably attachable to flexible lead 12 via end caps 14, 16. Examples of accessories may include, but are not limited to, leash handles and collar connectors for releasably coupling flexible lead 12 to an animal collar.

Similar to the removable attachment of ends 18, 20 to end caps 14, 16, an accessory may be removably attachable to an end cap (e.g., end cap 14, 16). As shown in FIGS. 1, 2, 5, and 6, a handle accessory may include various configurations. For example, handle 100, shown in FIGS. 1, 2, 5, and 6 may generally include a loop of fabric webbing, e.g., which may be removably attachable to an end cap (e.g., end cap 16). In an additional/alternative embodiment, handle 102, shown in FIG. 2, may include buckle 104 (e.g., such as a fastex-type buckle). Buckle 104 may allow handle 102 to be selectively placed in a closed loop configuration and/or an open configuration, e.g., by alternatively buckling and un-buckling buckle 104. As such, buckle 102 may allow handle 102 to be secured to an object, such as a tree, pole, post, or other object.

According to an embodiment, the handle (e.g., handle 100, 102) may include, for example, a layered structure. In one specific embodiment, handle 100 may include a layer of nylon webbing and a layer of Hypalon® coated nylon, having an intermediate fabric layer therebetween. (Hypalon is a registered trademark for a chlorosulfonated polyethylene (CSPE) synthetic rubber (CSM) available from DuPont Performance Elastomers.) The intermediate fabric layer may include any of various fabrics, including, but not limited to, nylon fabric, polyester fabric, cotton fabric, and the like. For example, the Hypalon material may be laser cut or die punched to achieve a desired shape or pattern. The cut Hypalon and the various other layers may be fastened together, e.g., via stitching, adhesive bonding, or other suitable method. In various additional/alternative embodiments, the handle may include, for example, a molded plastic component, a fabric component that is over-molded with a plastic material (e.g., an elastomer to improve gripping the handle, etc.). Various additional/alternative embodiments will similarly be appreciated.

Figure 7:
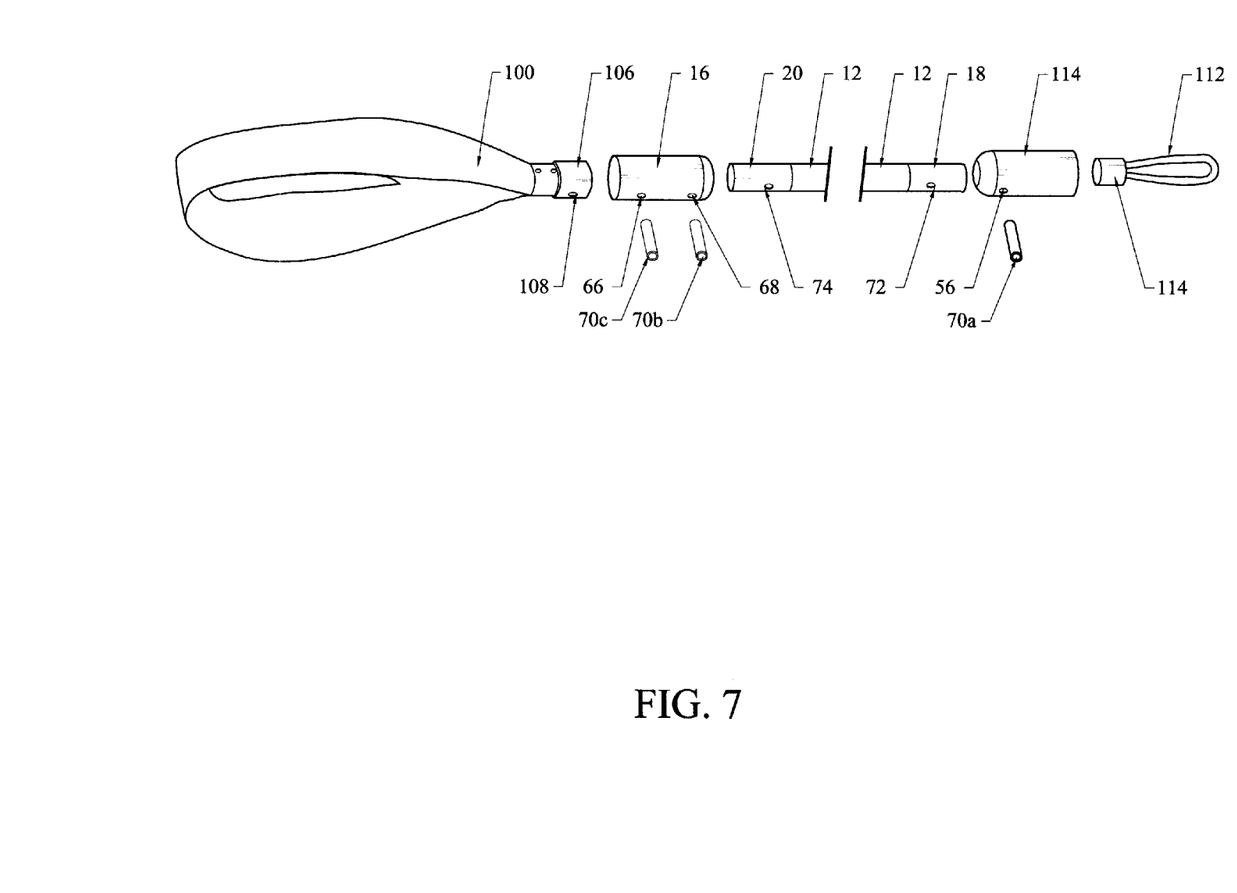
FIG. 7 is an exploded view of an embodiment of a modular leash system.

Handle 100 and handle 102 may be removably attachable to an end cap (e.g., end cap 16). For example, handle 100, 102 may be releasably attachable to end cap 16 via a screw (e.g., set screw 70c, shown in FIGS. 5 and 7), a pin, or the like, received through an opening in the end cap (e.g., hole 66 shown in FIGS. 4A, 4B and 7). For example, as shown in FIG. 7, handle 100 may include rigid end portion 106. Rigid end portion may include a rigid mater (such as a plastic or metallic tube). The ends of handle 100 may be coupled to rigid end 106 (e.g., by potting the ends into a tube using an adhesive). Additionally/alternatively, the ends of the fabric webbing forming the handle (e.g., handle 100, 102) may be impregnated together with a polymer resin, to form rigid end 106, in a similar manner as described with respect to rigid end portion 18 of flexible lead 12. Impregnating the ends of the fabric webbing of the handle together (e.g., such that the ends of the fabric webbing are joined together by the polymer resin) may form rigid end 106 of the handle (e.g., handle 100, 102), for example having a generally cylindrical geometry. Rigid end 106 may be configured to be at least partially received in an opening in an end cap (e.g., opening 60 in end cap 16*a*, shown in FIG. 4A). Set screw 70*c* may received in the hole in the end cap (e.g., hole 66 in end cap 16*a*) and a cooperating hole (e.g., hole 108) in rigid end 106 of handle 100 (and/or handle 102). Additionally/alternatively, a handle may be permanently attached to the rope of flexible lead 12, e.g., by being sewn thereto (not shown).

As mentioned above, the collar connector may be configured to be removably coupled to an animal collar. For example, the collar connector may include a connecting feature, such as a snap hook or carabiner (e.g., carabiner 110, shown in FIGS. 1, 2, 5 and 6). The end cap (e.g., end cap 14) may include a cable loop 112 configured to be releasably coupled to the carabiner (e.g., carabiner 110). With reference also to FIG. 7, cable loop 112 may include, for example, a length of cable (e.g., which may optionally be vinyl coated, or the like). The length of cable may be shaped into a loop with the ends thereof coupled within the end cap (e.g., end cap 14). For example, the free ends may be coupled to end piece 114 (e.g., which may be a plastic and/or metallic member that may be compressed around, adhesively or otherwise bonded, etc., to the free ends of cable loop 112), which may be received within opening 50 of end cap 14*a*, but which may not, for example pass through opening 54, thereby retaining cable loop 112 to end cap 14*a*. Various additional/alternative configurations may also be suitably employed.

Figure 8:
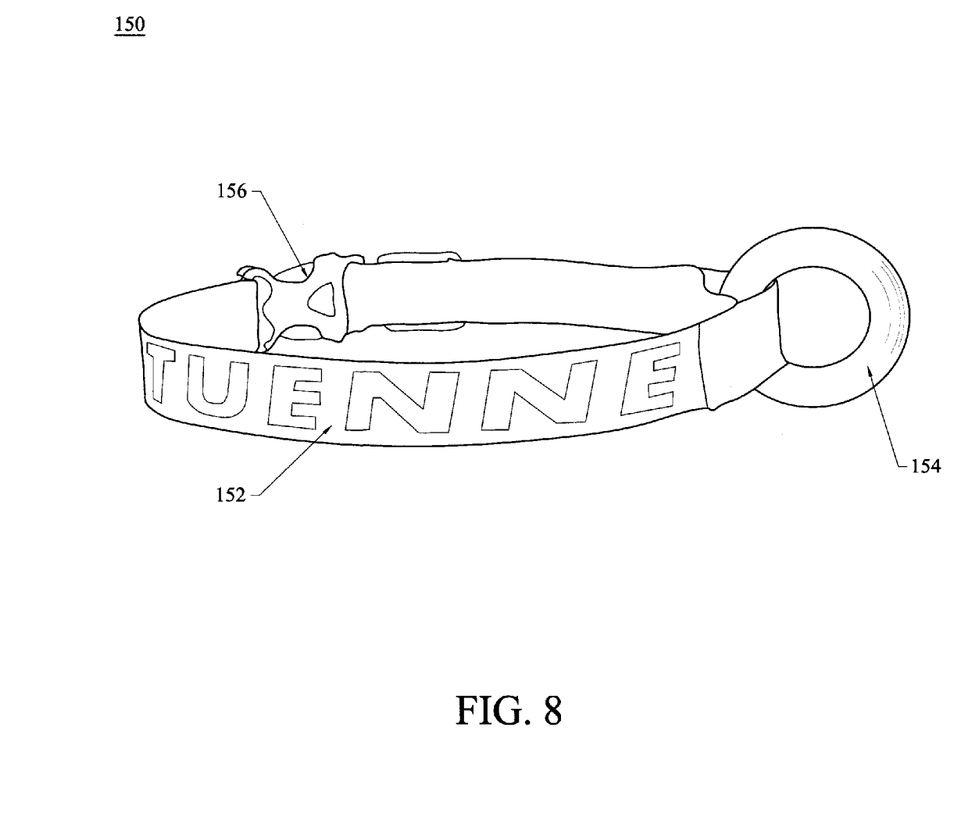
FIG. 8 depicts an embodiment of an animal collar.

Referring also to FIG. 8, animal collar 150 may generally include flexible member 152. Fastening ring 154 may be coupled to a first portion of flexible member 152. A counterweight may be coupled to a second portion flexible member 152. The counterweight may be configured to bias fastening ring 154 toward and upward position in use. For example, the counterweight may be generally opposed from fastening ring 154. As such, when collar 150 is in use (e.g., when collar is worn by an animal) the counterweight may tend to rotate collar 150 about the animal's neck to bias fastening ring 154 toward the top of the animal's neck. As such, fastening ring 154 may be biased toward a position that allows for facile access by an owner of the animal, e.g., allowing easy attachment of a leash (e.g., by connection of carabiner 110 to fastening ring 154).

According to various embodiments, flexible member 152 may include a fabric, leather, plastic, etc., material. For example, flexible member 152 may include woven fabric webbing. Further, according to various embodiments, fastening ring 154 may include an o-shaped ring. Additionally/alternatively the fastening ring may be oval, d-shaped, etc. Fastening ring may include any suitable material, such as metal (e.g., aluminum, steel, titanium, brass, or the like), plastic, or the like. The counterweight may include, at least in part, a buckle (e.g., buckle 156), which may, for example, be made of a relatively heavy material, such as steel, bronze, or the like, e.g., thereby providing a counterweight biasing. Additionally/alternatively, separate counterweight (not shown) may be coupled to flexible member 152. Suitable separate counterweights may include, for example, metallic weight, or the like. Various additional/alternative configurations may similarly be utilized to provide a bias of fastening ring 154 toward an upward position.

While various embodiments have been provided for the purpose of illustration, it will be appreciated that multiple variations and modifications may be possible. As such the scope of the present invention should not be limited by the foregoing disclosure and should be given the full scope of the appended claims.

What is claimed is:

1. A modular leash comprising:
    a flexible lead comprising a rope including a first end impregnated with a polymer resin to form a rigid portion;
    an end cap removably attachable directly to at least the rigid portion of the flexible lead; and
    an accessory removably attachable to the flexible lead via the end cap, wherein the end cap includes an opening configured to receive at least a portion of the rigid portion of the flexible lead, and the end cap is removably attachable to the first end of the flexible lead by a pin engageable with the first end of the flexible lead.

2. The modular leash according to claim 1, wherein the pin includes at least one of a roll pin and a screw.

3. The modular leash according to claim 2, wherein the screw is configured to be received in a hole in the rigid portion of the flexible lead.

4. The modular leash according to claim 1, wherein the accessory is removably attachable to the end cap.

5. The modular leash according to claim 4, wherein the accessory is removably attachable to the end cap by a screw engageable with at least a portion of the accessory.

6. The modular leash according to claim 1, wherein the accessory includes a leash handle.

7. The modular leash according to claim 1, wherein the accessory includes a collar connector for releasably coupling the flexible lead to an animal collar.

8. The modular leash according to claim 7, wherein the collar connector includes a carabiner.

9. The modular leash according to claim 8, wherein the end cap includes a cable loop configured to be releasably coupled to the carabiner.

10. A modular leash comprising:
    a flexible lead including a rope, a first and a second end of the rope impregnated with a generally rigid polymeric material to provide a first and second rigid end portion;
    a first end cap removably attachable directly to the first rigid end portion via a pin configured to be received through cooperating holes in the first end cap and the first rigid end portion, the first end cap including a loop for coupling the first end cap to a collar connector; and
    a second end cap removably attachable directly to the second rigid end portion via a second pin configured to be received through cooperating holes in the second end cap and the second rigid end portion, the second end cap configured to be coupled to a handle portion.

11. The modular leash according to claim 10, wherein the loop for coupling the first end cap to the collar connector includes a cable loop.

12. The modular leash according to claim 10, wherein the second end cap is configured to be removably coupled to the handle portion.

13. The modular leash according to claim 10, wherein at least one of the pin and the second pin includes at least one of a roll pin and a screw.

* * * * *